(12) United States Patent
Chen

(10) Patent No.: US 8,844,952 B2
(45) Date of Patent: Sep. 30, 2014

(54) BALANCE BIKE

(71) Applicant: Wang-Chuan Chen, Taichung (TW)

(72) Inventor: Wang-Chuan Chen, Taichung (TW)

(*) Notice: Subject to any disclaimer, the term of this patent is extended or adjusted under 35 U.S.C. 154(b) by 0 days.

(21) Appl. No.: 13/762,629

(22) Filed: Feb. 8, 2013

(65) Prior Publication Data

US 2014/0077470 A1 Mar. 20, 2014

(30) Foreign Application Priority Data

Sep. 20, 2012 (EM) .................................. 002106237

(51) Int. Cl.
B62M 1/00 (2010.01)
B62K 9/00 (2006.01)

(52) U.S. Cl.
CPC ........................................ B62K 9/00 (2013.01)
USPC .................................... 280/87.021; 280/87.05

(58) Field of Classification Search
CPC .............. B62K 3/00; B62K 3/02; B62K 9/00;
B62K 19/18; B62K 2015/00; B62K 2015/001;
A63H 17/00; A63H 17/16; A63H 7/00
USPC ........ 280/7.1, 7.15, 281.1, 282, 639, 40, 657,
280/87.01, 87.021, 87.05, 87.051, 63, 64;
D21/760, 763, 419, 424, 426, 432
See application file for complete search history.

(56) References Cited

U.S. PATENT DOCUMENTS

| 8,517,406 | B2 * | 8/2013 | Diekman et al. | 280/282 |
| 2006/0033297 | A1 * | 2/2006 | Miller | 280/87.021 |
| 2007/0164529 | A1 * | 7/2007 | Lin | 280/87.021 |
| 2010/0148460 | A1 * | 6/2010 | Nelson et al. | 280/87.021 |
| 2013/0292920 | A1 * | 11/2013 | Alan | 280/274 |

* cited by examiner

Primary Examiner — John Walters
(74) Attorney, Agent, or Firm — Alan Kamrath; Kamrath IP Lawfirm, P.A.

(57) ABSTRACT

A balance bike includes a frame, and front and rear wheel assemblies respectively pivotally mounted on two opposite ends of the frame. The rear wheel assembly is pivotable with respect to the frame to synchronously adjust a seat height defined as a vertical distance extending from a saddle of the frame to a horizontal plane and a wheelbase defined as a horizontal distance extending between centers of the two wheels respectively rotatably mounted in the front and rear wheel assemblies to be suitable for various size requirements.

9 Claims, 8 Drawing Sheets

BALANCE BIKE

BACKGROUND OF THE INVENTION

1. Field of the Invention

The present invention relates to a balance bike and, more particularly, to a balance bike able to synchronously adjust a seat height and a wheelbase to be suitable for various size requirements.

2. Description of the Related Art

A balance bike is a training bicycle built without any pedals, crankset and chain. The balance bike helps children learn to balance, steer, walk, glide, and push themselves forward thereon without worrying about pedaling. To function properly, the balance bike must be small enough that a child can walk the balance bike while sitting comfortably in a saddle of the balance bike, putting both feet flat on the ground. Thus, the child first walks the balance bike while standing over the saddle and, then, while sitting in the saddle. Eventually, the child feels comfortable enough to run and scoot while riding the balance bike and, then, to lift both feet off the ground and cruise while balancing on two wheels of the balance bike.

Further, the conventional balance bike has a fixed seat height defined from the saddle to the ground, and a fixed wheelbase defined between centers of the front and rear wheels thereof. However, the fixed seat height and wheelbase can not be adjusted to accommodate the child's growth. Actually, most children outgrow their balance bike in a year or two.

Thus, a need exists for a novel balance bike that mitigates and/or obviates the above disadvantages.

SUMMARY OF THE INVENTION

The present invention solves this need and other problems in the field of balance bikes by providing a balance bike including a frame, and front and rear wheel assemblies respectively pivotally mounted on two opposite ends of the frame. The rear wheel assembly is pivotable with respect to the frame to synchronously adjust a seat height defined as a vertical distance extending from a saddle of the frame to a horizontal plane and a wheelbase defined as a horizontal distance extending between centers of the front and rear wheels respectively rotatably mounted in the front and rear wheel assemblies to be suitable for various size requirements.

The frame further includes a body portion extended from the saddle, with an arc-shaped locating slot formed in the body portion.

Preferably, the arc-shaped locating slot is extended along a circumferential direction of a virtual circle, whose center is defined in a pivoting hole.

In a preferred form, the locating slot includes a plurality of receiving sections, and a plurality of restraining sections connected with the plurality of receiving sections.

Preferably, the plurality of receiving sections and the plurality of restraining sections are arranged in a staggered arrangement.

The front wheel assembly includes the front wheel rotatably mounted in a fork, which is connected with and controlled by a handlebar adapted to be gripped and pivoted with respect to the frame by a user to steer the balance bike.

The rear wheel assembly includes the rear wheel rotatably mounted on distal ends of two swing arms, which are pivotally connected with the body portion of the frame. The body portion of the frame is received between the two swing arms. Each of the two swing arms includes first and second apertures formed at two opposite ends thereof.

In particular, the two first apertures are alignable with one of the plurality of receiving sections of the locating slot of the frame. The second aperture of each of the two swing arms is disposed adjacent to the front wheel assembly.

In particular, the two second apertures are aligned and interconnected with the pivoting hole of the frame.

Additionally, the balance bike further includes two fastening assemblies each having a fastener and a restrainer threadly engageable with each other.

In a preferred form, the fastener is a bolt, and the restrainer is a T-shaped elongated nut.

Each of the plurality of receiving sections has a circular cross section, and a first distance defined therein. Each of the plurality of restraining sections has an elongated cross section, and a second distance defined therein. The first distance of each of the plurality of receiving sections is greater than the second distance of each of the plurality of restraining sections.

The restrainer of each of the two fastening assemblies has a circular cross section corresponding to that of each of the plurality of receiving sections, and a third distance defined therein. The third distance is equal to the first distance.

It is an object of the present invention to provide a balance bike able to synchronously adjust a seat height and a wheelbase to be suitable for various size requirements.

Other objects, advantages, and new features of the present invention will become apparent from the following detailed description of the invention when considered in conjunction with the accompanied drawings.

BRIEF DESCRIPTION OF THE DRAWINGS

The illustrative embodiments may best be described by reference to the accompanying drawings where.

Figure 1:
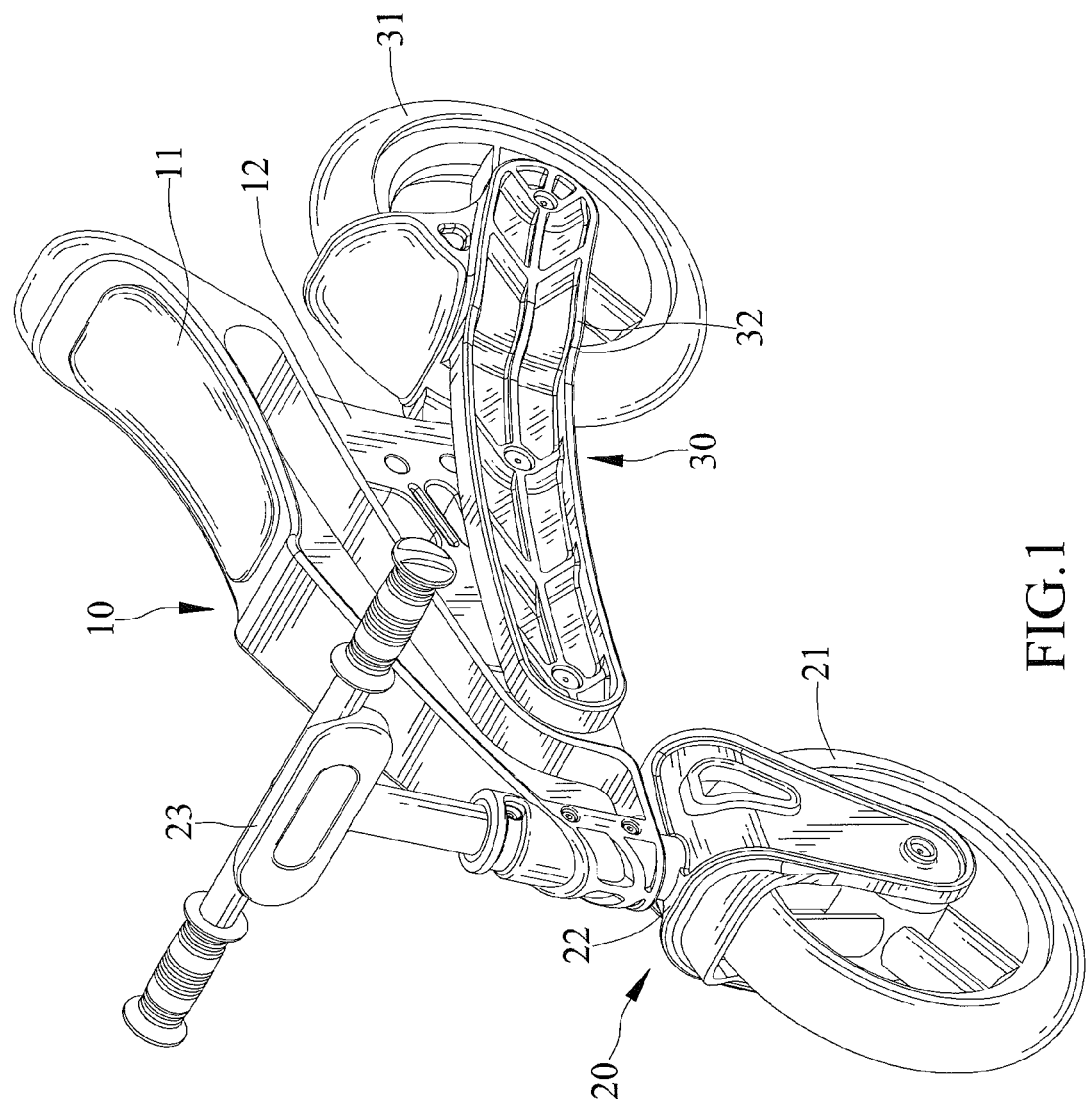
FIG. 1 shows a perspective view of a balance bike according to the present invention.
Figure 2:
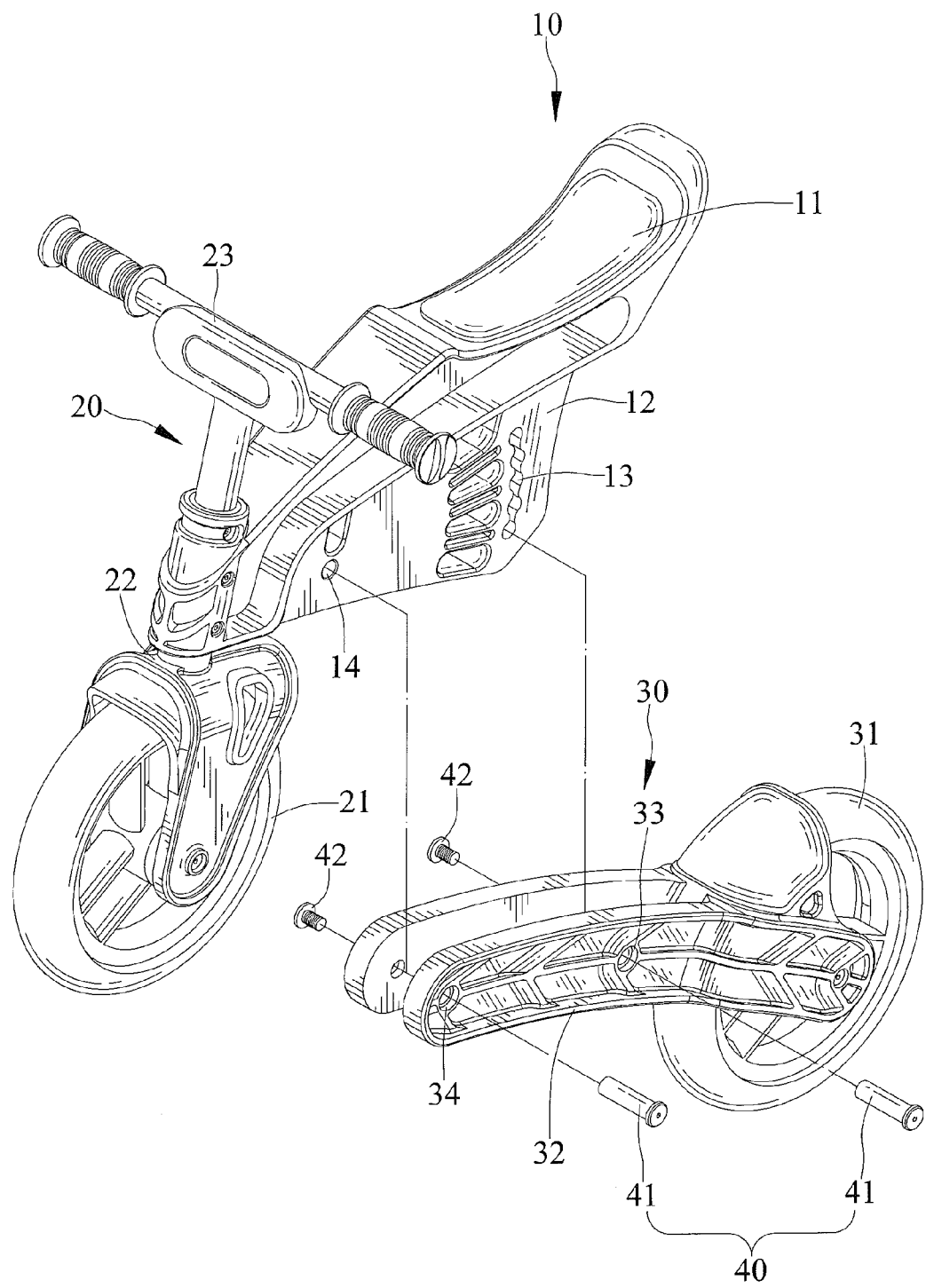
FIG. 2 shows a partial exploded, perspective view of the balance bike of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE PREFERRED EMBODIMENTS

FIGS. 1 through 8 show a balance bike according to the present invention. The balance bike includes a frame 10, a front wheel assembly 20 pivotally mounted on one end of the frame 10, and a rear wheel assembly 30 pivotally mounted on the other end of the frame 10 opposite to the front wheel assembly 20. In particular, the front wheel assembly 20 is pivotable with respect to the frame 10 to steer the balance bike, and the rear wheel assembly 30 is pivotable with respect to the frame 10 to synchronously adjust a seat height H and a wheelbase L to be suitable for various size requirements. The seat height H is defined as a vertical distance extending from a saddle 11 of the frame 10 to a horizontal plane, such as the ground when the balance bike is oriented perpendicular to the horizontal plane. The wheelbase L is defined as a horizontal distance extending between centers of the front and rear wheels 21 and 31 respectively rotatably mounted in the front and rear wheel assemblies 20 and 30.

The frame 10 further includes a body portion 12 vertically extended from the saddle 11, an arc-shaped locating slot 13 formed in the body portion 12, and a pivoting hole 14 formed in the body portion 12 and disposed adjacent to the front wheel assembly 20. The arc-shaped locating slot 13 is extended along a circumferential direction of a virtual circle, whose center is defined in the pivoting hole 14. In a preferred form, the locating slot 13 includes a plurality of receiving sections 131, and a plurality of restraining sections 132 connected with the plurality of receiving sections 131. The plurality of receiving sections 131 and the plurality of restraining sections 132 are arranged in a staggered arrangement. Each of the plurality of receiving sections 131 has a circular cross section, and a first distance D1 defined therein. Each of the plurality of restraining sections 132 has an elongated cross section, and a second distance D2 defined therein. In particular, the first distance D1 of each of the plurality of receiving sections 131 is greater than the second distance D2 of each of the plurality of restraining sections 132.

The front wheel assembly 20 includes the front wheel 21 rotatably mounted in a fork 22, which is connected with and controlled by a handlebar 23 adapted to be gripped and pivoted with respect to the frame 10 by a user to steer the balance bike.

The rear wheel assembly 30 includes the rear wheel 31 rotatably mounted on distal ends of two swing arms 32, which are pivotally connected with the body portion 12 of the frame 10. The body portion 12 of the frame 10 is received between the two swing arms 32. Each of the two swing arms 32 includes first and second apertures 33 and 34 formed at two opposite ends thereof. The first aperture 33 of each of the two swing arms 32 is disposed adjacent to the rear wheel 31. In particular, the two first apertures 33 are alignable with one of the plurality of receiving sections 131 of the locating slot 13 of the frame 10. The second aperture 34 of each of the two swing arms 32 is disposed adjacent to the front wheel assembly 20. In particular, the two second apertures 34 are aligned and interconnected with the pivoting hole 14 of the frame 10.

Additionally, the balance bike further includes two fastening assemblies 40 each having a fastener 41 and a restrainer 42 threadly engageable with each other. In a preferred form, the fastener 41 is a bolt, and the restrainer 42 is a T-shaped elongated nut. The restrainer 42 of each of the two fastening assemblies 40 has a circular cross section corresponding to that of each of the plurality of receiving sections 131, and a third distance D3 defined therein. The third distance D3 is equal to the first distance D1.

One of the two fastening assemblies 40 is engageable into the two first apertures 33 of the rear wheel assembly 30 and one of the plurality of receiving sections 131 of the locating slot 13 of the frame 10 to cause the rear wheel assembly 30 to be selectively fixed to the frame 10. However, the third distance D3 of the restrainer 42 equal to the first distance D1 of the receiving section 131 is greater than the second distance D2 of the restraining section 132 to prevent the restrainer 42 disengaging from the receiving sections 131 and to avoid the rear wheel assembly 30 pivoting with respect to the frame 10.

Figure 3:
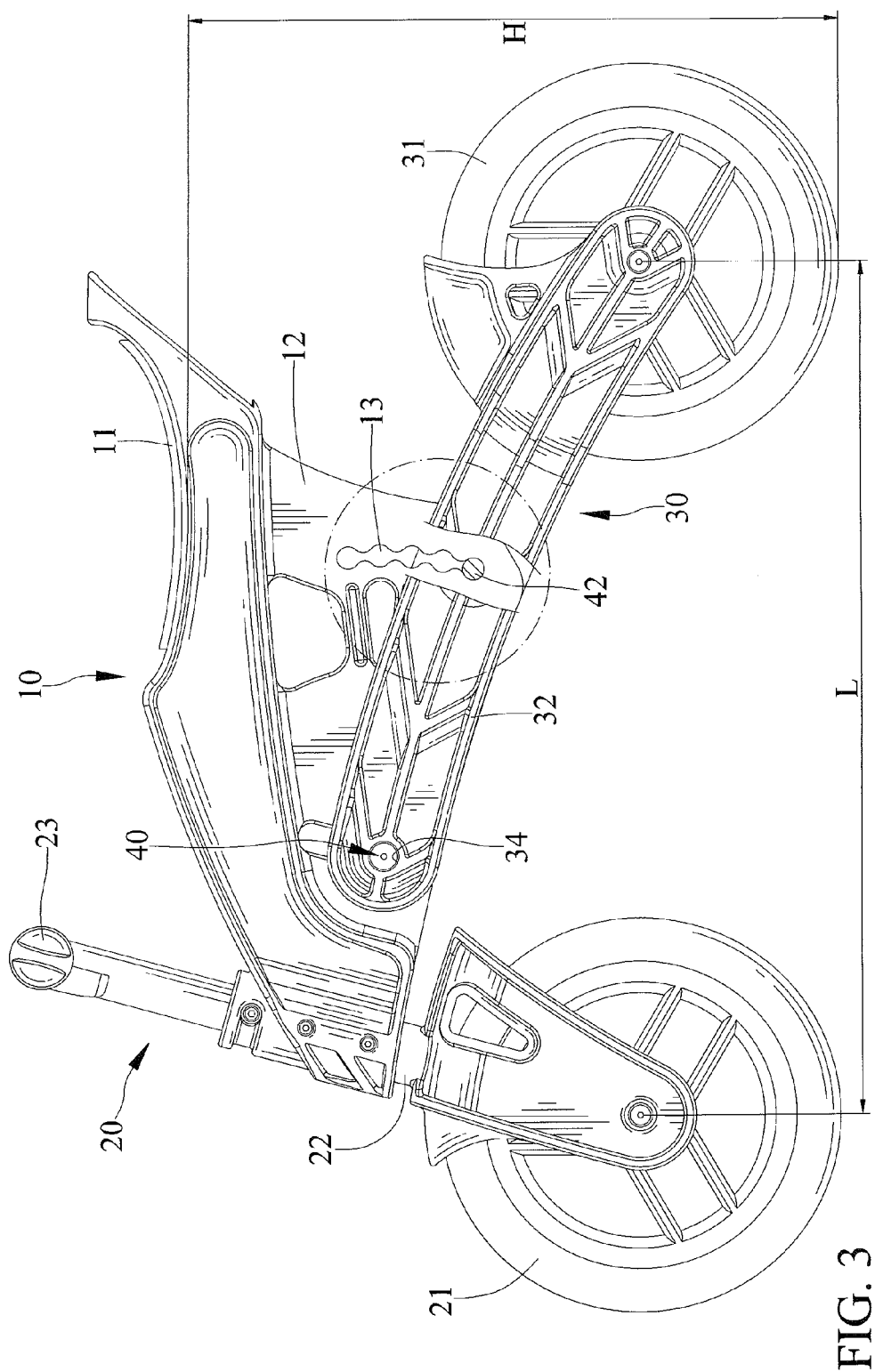
FIG. 3 shows a side view of the balance bike of FIG. 1.
Figure 4:
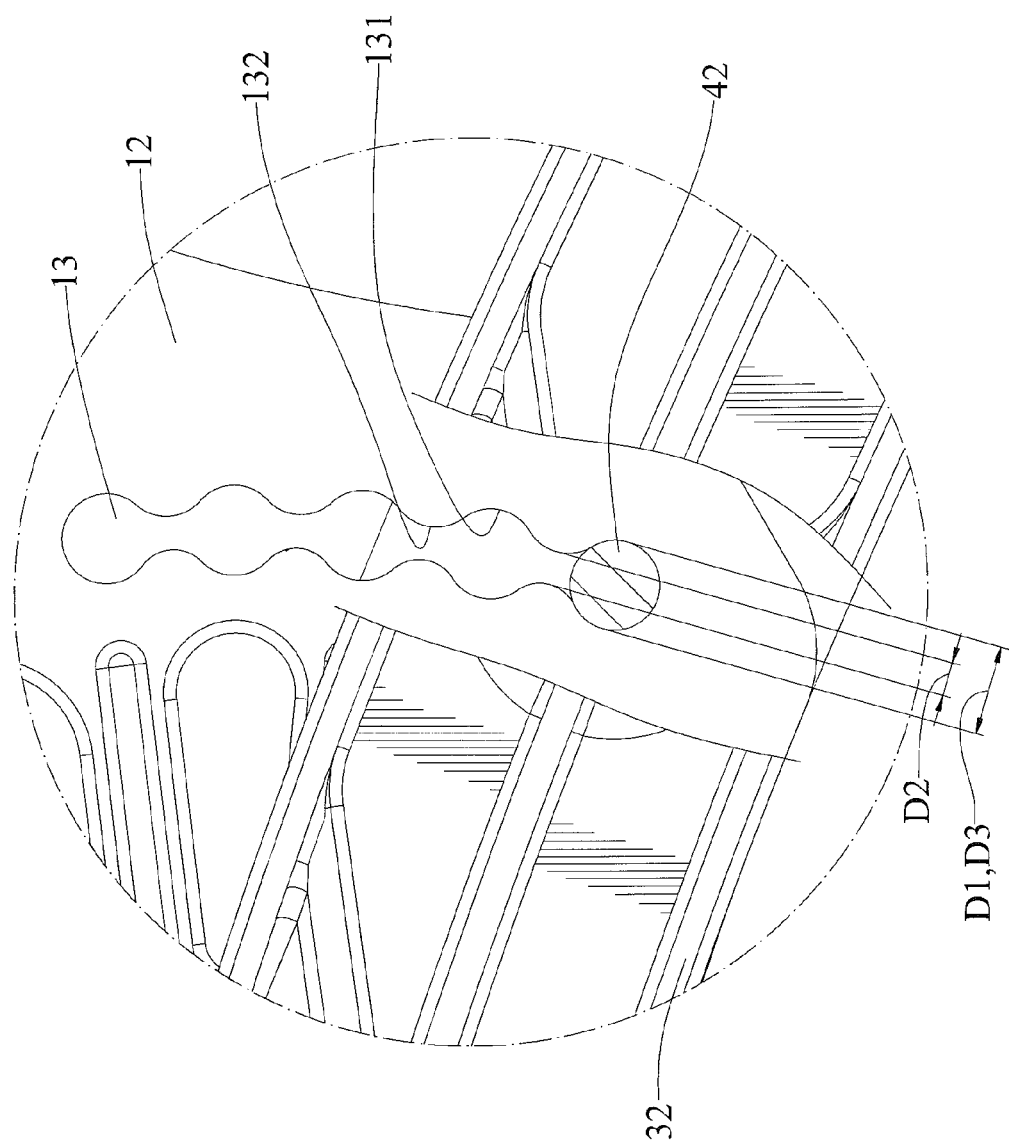
FIG. 4 shows a partial, enlarged view of the balance bike shown in FIG. 3.
Figure 5:
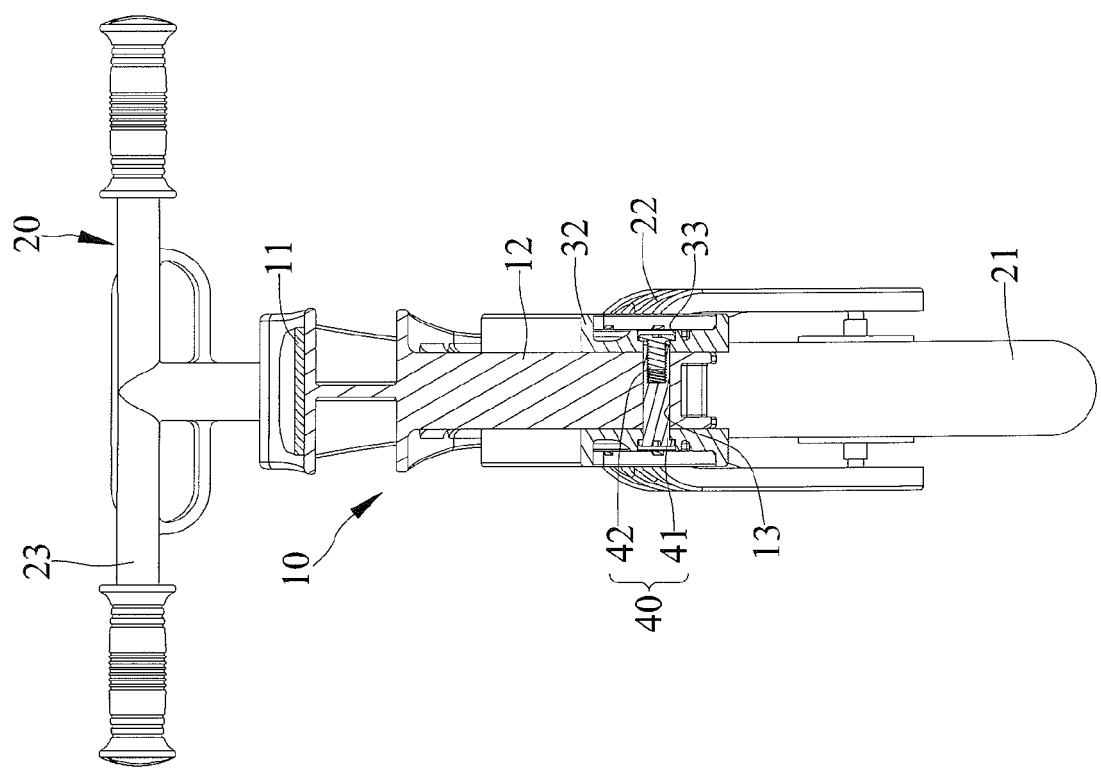
FIG. 5 shows a cross-sectional view of the balance bike shown in FIG. 1.
Figure 6:
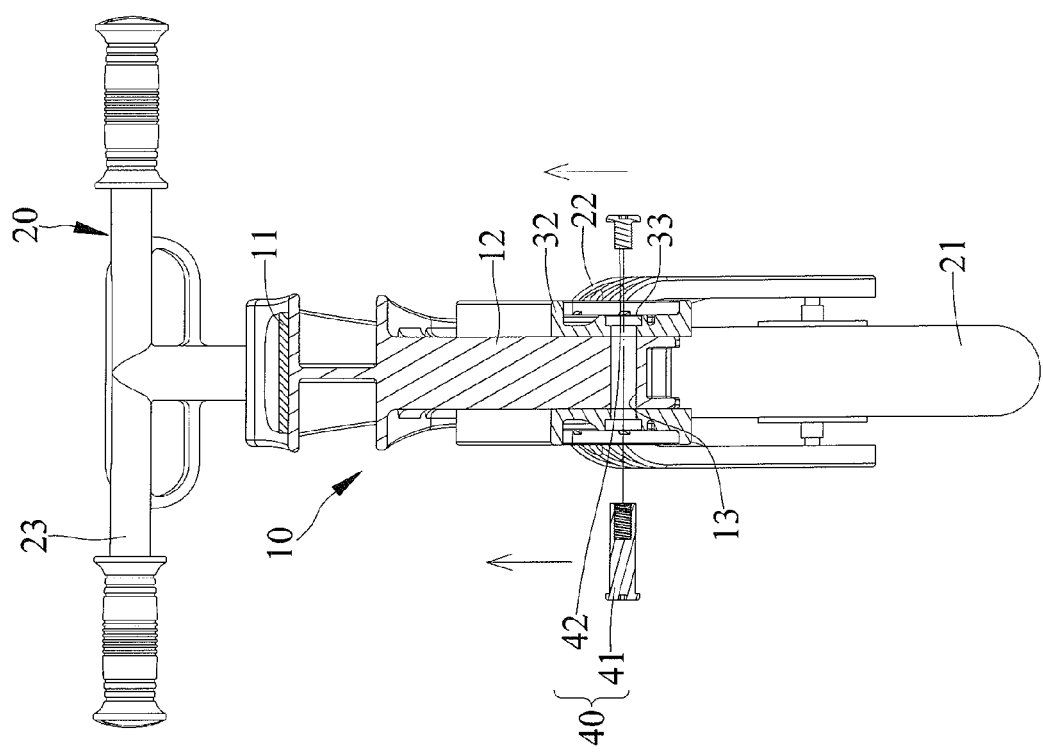
FIG. 6 shows a continued view of the balance bike of FIG. 5, and illustrates a fastener disengageable from a restrainer of one fastening assembly received in a locating slot of a frame to cause a rear wheel assembly to be pivotable with respect to the frame.

FIG. 3 shows the one of the two fastening assemblies 40 engaged into the two first apertures 33 and the nethermost one of the plurality of receiving sections 131 of the locating slot 13 disposed opposite to the saddle 11. Here, the balance bike has the highest seat height H and the shortest wheel base L.

The other one of the two fastening assemblies 40 is engaged into the two second apertures 34 of the rear wheel assembly 30 and the pivoting hole 14 of the frame 10 to cause the rear wheel assembly 30 to be pivotable with respect to the frame 10.

However, the fastener 41 is disengageable from the restrainer 42 of one of the two fastening assemblies 40 separated from the locating slot 13 to cause the rear wheel assembly 30 to be pivotable with respect to the frame 10.

Figure 7:
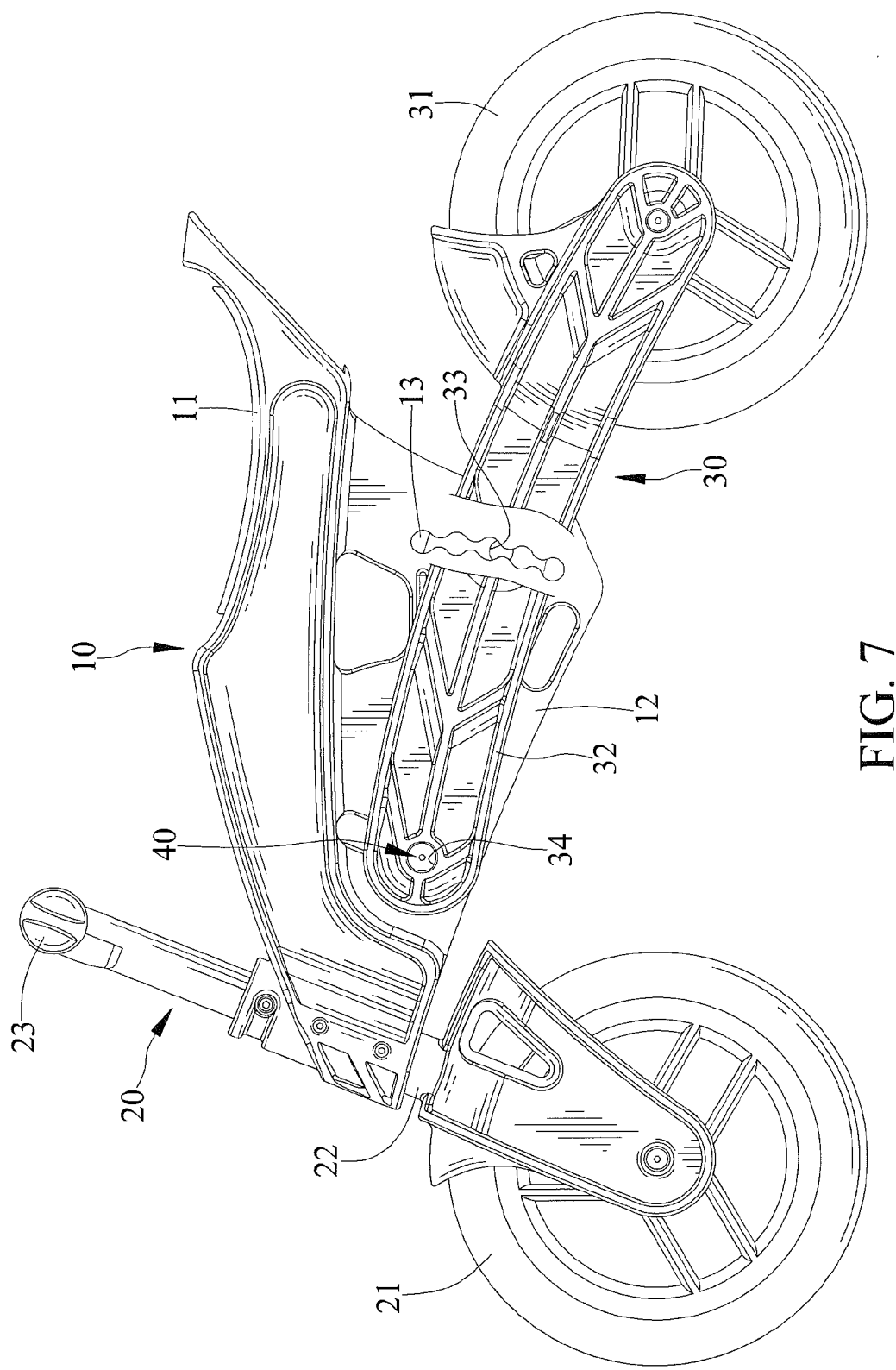
FIG. 7 shows a side view of the balance bike of FIG. 1, and illustrates the rear wheel assembly pivoted with respect to the frame.
Figure 8:
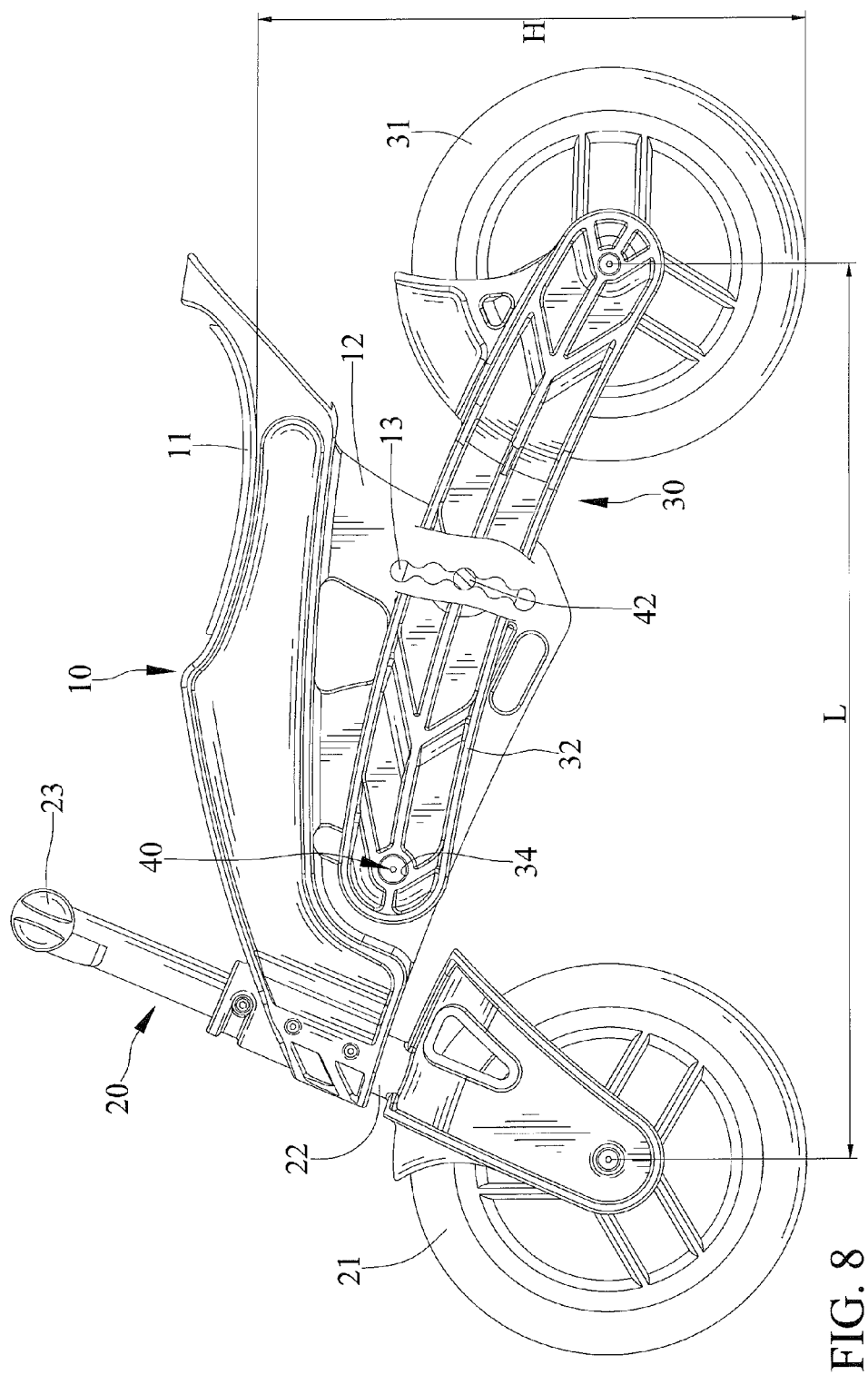
FIG. 8 shows a continued view of the balance bike of FIG. 7, and illustrates the fastener engaged with the restrainer of the fastening assembly.

FIGS. 7 and 8 show the rear wheel assembly 30 pivoted to cause the two first apertures 33 aligned with the middle one of the plurality of receiving sections 131 of the locating slot 13 of the frame 10, and the fastener 41 reengaged with the restrainer 42 of one of the two fastening assemblies 40 is engaged into the two first apertures 33 of the rear wheel assembly 30 and the middle one of the plurality of receiving sections 131 of the locating slot 13 of the frame 10 to adjust the seat height H and the wheelbase L, synchronously. Here, the balance bike has a seat height H lower than that of FIG. 3 and a wheel base L longer than that of FIG. 3.

The balance bike includes the following advantages:

1. The balance bike includes a frame 10, a front wheel assembly 20 pivotally mounted on one end of the frame 10, and a rear wheel assembly 30 pivotally mounted on the other end of the frame 10 opposite to the front wheel assembly 20. The front wheel assembly 20 is pivotable with respect to the frame 10 to steer the balance bike, and the rear wheel assembly 30 is pivotable with respect to the frame 10 to synchronously adjust a seat height H and a wheelbase L to be suitable for various size requirements.

Now that the basic teachings of the balance bike have been explained, many extensions and variations will be obvious to one having ordinary skill in the art. For example, the frame 10, and the front and rear wheel assemblies 20 and 30 can have shapes different from those shown in the figures.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A balance bike comprising:
a frame including a saddle, a body portion extended from the saddle, and a locating slot formed in the body portion;
a front wheel assembly pivotally mounted on a first end of the frame, with the front wheel assembly including a front wheel; and
a rear wheel assembly pivotally mounted on a second end of the frame opposite to the front wheel assembly, with the rear wheel assembly including a rear wheel rotatably mounted therein, and two swing arms pivotally connected with the body portion of the frame, with each of the two swing arms including a first aperture disposed adjacent to the rear wheel and alignable with the locating slot of the frame, with a first fastening assembly engageable into the two first apertures of the rear wheel assembly and the locating slot of the frame to cause the rear wheel assembly to be selectively fixed to the frame;
wherein the rear wheel assembly is pivotable with respect to the frame to synchronously adjust a seat height and a wheelbase to be suitable for various size requirements, with the seat height defined as a vertical distance extending from a saddle to a horizontal plane, with the wheelbase defined as a horizontal distance extending between centers of the front and rear wheels.

2. The balance bike as claimed in claim 1, wherein the locating slot includes a plurality of receiving sections, and a plurality of restraining sections connected with the plurality of receiving sections, with the plurality of receiving sections and the plurality of restraining sections arranged in a staggered arrangement.

3. The balance bike as claimed in claim 2, wherein each of the plurality of receiving sections has a circular cross section, and a first distance defined therein, wherein each of the plurality of restraining sections has an elongated cross section, and a second distance defined therein, wherein the first fastening assembly includes a fastener and a restrainer engageable with each other, with the restrainer having a circular cross section corresponding to that of each of the plurality of receiving sections, and a third distance defined therein, wherein the first distance is equal to the third distance and greater than the second distance.

4. The balance bike as claimed in claim 3, wherein the fastener is disengageable from the restrainer of the first fastening assembly separated from the locating slot to cause the rear wheel assembly to be pivotable with respect to the frame.

5. The balance bike as claimed in claim 3, wherein the fastener is a bolt, wherein the restrainer is a T-shaped elongated nut.

6. The balance bike as claimed in claim 1, wherein the frame further includes a pivoting hole formed in the body portion and disposed adjacent to the front wheel assembly, with the locating slot extended along a circumferential direction of a virtual circle, with a center of the virtual circle defined in the pivoting hole.

7. The balance bike as claimed in claim 6, wherein each of the two swing arms includes a second aperture formed opposite to the first aperture, with the two second apertures aligned and interconnected with the pivoting hole of the frame, with second fastening assemblies engaged into the two second apertures of the rear wheel assembly and the pivoting hole of the frame to cause the rear wheel assembly to be pivotable with respect to the frame.

8. The balance bike as claimed in claim 1, wherein the locating slot is formed in an arc shape.

9. The balance bike as claimed in claim 1, wherein the front wheel is rotatably mounted in a fork connected with and controlled by a handlebar adapted to be gripped and pivoted with respect to the frame by a user to steer the balance bike.

* * * * *